(12) United States Patent
Kozono et al.

(10) Patent No.: US 12,045,436 B2
(45) Date of Patent: Jul. 23, 2024

(54) DISPLAY CONTROL DEVICE FOR VEHICLE, DISPLAY METHOD FOR VEHICLE, AND NON-TRANSITORY RECORDING MEDIUM FOR VEHICLE

(71) Applicant: TOYOTA JIDOSHA KABUSHIKI KAISHA, Toyota (JP)

(72) Inventors: Yuki Kozono, Okazaki (JP); Shu Nakajima, Toyota (JP); Keigo Hori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/203,324

(22) Filed: May 30, 2023

(65) Prior Publication Data

US 2024/0028179 A1  Jan. 25, 2024

(30) Foreign Application Priority Data

Jul. 21, 2022  (JP) ................................ 2022-116754

(51) Int. Cl.
*G06F 3/04817* (2022.01)
*B60K 35/00* (2006.01)
(Continued)

(52) U.S. Cl.
CPC .......... *G06F 3/04817* (2013.01); *B60K 35/00* (2013.01); *B62D 1/046* (2013.01);
(Continued)

(58) Field of Classification Search
CPC .... G06F 3/04883; G06F 3/017; G06F 3/0488; G06F 3/04847; G06F 3/0487; G06F 3/033; G06F 2203/0339; G06F 3/0416; G06F 3/0421; G06F 3/04842; G06F 3/016; G06F 2203/04101; G06F 3/04817; G06F 3/0482; G06F 3/0362; G06F 2203/04808; G06F 3/013; G06F 3/167; G06F 3/011; G06F 3/0238; G06F 3/0484; G06F 3/0485; G06F 1/163; G06F 2203/04105; G06F 3/041; G06F 3/04855; G06F 3/14; G06F 3/01; G06F 3/038; G06F 3/04886;
(Continued)

(56) References Cited

U.S. PATENT DOCUMENTS

2009/0164062 A1* 6/2009 Aoki .................... B60Q 1/0082
701/36
2012/0283894 A1* 11/2012 Naboulsi ............. G06F 3/04883
701/1
(Continued)

FOREIGN PATENT DOCUMENTS

JP  2022-048508 A  3/2022

*Primary Examiner* — Rayeez R Chowdhury
(74) *Attorney, Agent, or Firm* — Oliff PLC

(57) ABSTRACT

A display control device for a vehicle includes a memory, and at least one processor connected to the memory. The at least one processor displays, on a display portion provided at a front side of a steering wheel, plural icons corresponding to a steering wheel switch group, and sets aspect ratios of the icons such that a proportion of a width in the aspect ratio of the icon is large as compared with a proportion of a width in a width-to-height ratio of a corresponding operation region of the steering wheel.

8 Claims, 8 Drawing Sheets

(51) Int. Cl.
  *B62D 1/04* (2006.01)
  *G06F 3/02* (2006.01)
  *G06F 3/04886* (2022.01)
  *G06T 3/40* (2006.01)
  *B60K 35/60* (2024.01)

(52) U.S. Cl.
  CPC ............ *G06F 3/02* (2013.01); *G06F 3/04886* (2013.01); *G06T 3/40* (2013.01); *B60K 35/60* (2024.01); *B60K 2360/782* (2024.01); *G06F 2203/04803* (2013.01); *G06T 2200/24* (2013.01)

(58) Field of Classification Search
  CPC .. G06F 3/03547; G06F 3/1423; G06F 3/0481; G06F 3/147; G06F 2203/0381; G06F 3/02; G06F 3/04815; G06F 17/00; G06F 2203/04803; G06F 3/012; G06F 3/014; G06F 3/0338; G06F 3/04812; G06F 3/04845; G06F 3/0486; G06F 9/451
  See application file for complete search history.

(56) References Cited

U.S. PATENT DOCUMENTS

| | | | | |
|---|---|---|---|---|
| 2014/0058584 | A1* | 2/2014 | Weng | G06F 7/00 |
| | | | | 701/1 |
| 2015/0033174 | A1* | 1/2015 | Hisatsugu | B60K 35/00 |
| | | | | 715/771 |
| 2016/0297462 | A1* | 10/2016 | Sonoda | B62D 1/046 |
| 2022/0083201 | A1 | 3/2022 | Kozono et al. | |

* cited by examiner

DISPLAY CONTROL DEVICE FOR VEHICLE, DISPLAY METHOD FOR VEHICLE, AND NON-TRANSITORY RECORDING MEDIUM FOR VEHICLE

CROSS-REFERENCE TO RELATED APPLICATION

This application is based on and claims priority under 35 USC 119 from Japanese Patent Application No. 2022-116754 tiled on Jul. 21, 2022, the disclosure of which is incorporated by reference herein.

BACKGROUND

Technical Field

The present disclosure relates to a display control device for a vehicle, a display method for a vehicle, and a non-transitory recording medium for a vehicle.

Related Art

Japanese Patent Application Laid-Open (JP-A) No. 2020-048508 discloses a display control device in which plural switches are provided at a steering wheel. In this display control device, in a case in which touching of or proximity to an operation portion is sensed at any of plural operation portions provided within the vehicle cabin, information corresponding to that operation portion is displayed on a display portion that is within the vehicle cabin.

In the display examples of this document, icons of information corresponding to the operation portion are displayed in an arrangement that corresponds to the arrangement of the switches.

By having the positional relationships of the switches and the displays of the icons corresponding to the operation portion correspond to one another as in the display control device disclosed in JP-A No. 2020-048508, it is easy for a vehicle occupant to operate an arbitrary switch in a state in which his/her sightline is directed forward. However, the display region of the display portion is limited, and it is often the case that there are great constraints on ensuring the region of the display portion in the vertical direction in particular. Therefore, the possibility of erroneous input is high when plural icons are disposed near to one another on the display portion.

SUMMARY

In view of the above-described circumstances, an object of the present invention is to provide a display control device for a vehicle, a display method for a vehicle, and a non-transitory recording medium for a vehicle that can suppress erroneous input at the time when a vehicle occupant operates a steering wheel switch, without the vehicle occupant greatly moving his/her sightline while driving.

A display control device for a vehicle relating to a first aspect of the present disclosure is a display control device for a vehicle displaying, on a display portion provided at a front side of a steering wheel, plural icons corresponding to a steering wheel switch group, the device including a display control section that sets aspect ratios of the icons such that a proportion of a width in the aspect ratio of the icon is large as compared with a proportion of a width in a width-to-height ratio of a corresponding operation region of the steering wheel.

In the display control device for a vehicle relating to the first aspect of the present disclosure, the display portion, which is provided at the front side of the steering wheel, displays the plural icons that correspond to the steering wheel switch group. Due thereto, the vehicle occupant can perceive an arbitrary switch in a state in which his/her sightline is directed forward, without directing his/her gaze toward the steering wheel switches.

The aspect ratios of the icons that are displayed on the display portion are set such that the proportion of the width in the aspect ratio of the icon is large as compared with the proportion of the width in the width-to-height ratio of the corresponding operation region of the steering wheel. Due thereto, even if there are great constraints on the region in the vertical direction when plural icons are displayed on the display portion, by setting the proportion of the width in the aspect ratio of each icon to be large, the icons can be presented in a form in which it is easy to grasp the arrangement of the plural icons. As a result, erroneous input at the time when a vehicle occupant operates a steering wheel switch while looking at the display portion can be suppressed.

In a display control device for a vehicle relating to a second aspect of the present disclosure, in the structure of the first aspect, the steering wheel switch group is disposed so as to be divided into the plural operation regions that are provided on a surface of the steering wheel, the display control device for a vehicle includes an operation sensing section that senses operation with respect to one of the plural operation regions, and, in a case in which operation with respect to one of the plural operation regions is sensed by the operation sensing section, the display control section displays the icons corresponding to a first operation region at which the operation was sensed and a second operation region that is adjacent to the first operation region.

In the display control device for a vehicle relating to the second aspect of the present disclosure, operation with respect to one of the plural operation regions provided at the surface of the steering wheel is sensed. In a case in which operation with respect to one of the plural operation regions is sensed, icons corresponding to the first operation region at which the operation was sensed and the second operation region that is adjacent to the first operation region are displayed. Due thereto, while the vehicle occupant is operating a switch that is disposed in one operation region, the vehicle occupant can grasp the arrangement of the switches of the adjacent operation region from the icons. Further, when plural icons are located near one another in such a case, as described above, erroneous input at the time when a vehicle occupant operates a steering wheel switch while looking at the display portion can be suppressed. Note that, what is called "operation" here is a concept encompassing, for example, the pressing of an operation region, the touching of an operation region, and the like.

In a display control device for a vehicle relating to a third aspect of the present disclosure, in the structure of the first or second aspect, at the steering wheel, operation surfaces of plural switches are separated by a distinguishing projection that is provided so as to project-out at the operation regions, and the display control section displays the plural icons, which correspond to sections demarcated by the distinguishing projection, with a distinguishing gap that corresponds to the distinguishing projection provided between the icons that are adjacent.

In the display control device for a vehicle relating to the third aspect of the present disclosure, the icons, which correspond to sections demarcated by the distinguishing projection that is provided so as to project-out at the operation regions of the steering wheel, are displayed with a distinguishing gap that corresponds to the distinguishing projection provided between the icons that are adjacent. Due thereto, the tactile perception of the operating finger of the vehicle occupant riding-up over the distinguishing projection at the time of moving between adjacent switches is associated with the visual information of crossing-over the distinguishing Imp and operating the adjacent icon. Therefore, a vehicle occupant can carry out intuitive operation of a switch while looking at the display portion.

In a display control device for a vehicle relating to a fourth aspect of the present disclosure, in the structure of the first aspect, the steering wheel has a pair of rim portions that are provided so as to protrude-out leftward and rightward from a central portion and that are grasped by a vehicle occupant, the operation regions include a first operation region provided at a height of a center of the rim portion, a second operation region provided at a height of an upper portion of the rim portion, and a third operation region provided at a height of a lower portion of the rim portion, at an inner side of the pair of rim portions, and the display control section displays a first icon, a second icon and a third icon so as to correspond to a positional relationship of the first operation region, the second operation region and the third operation region, and the first icon that corresponds to the first operation region is displayed so as to protrude-out toward a transverse direction outer side of the display portion, with respect to the second icon and the third icon.

In the display control device for a vehicle relating to the fourth aspect of the present disclosure, the first icon is displayed so as to correspond to the first operation region that is provided at the height of the center of the rim portion, at the inner side of the pair of rim portions. The second icon is displayed so as to correspond to the second operation region that is provided at the height of the upper portion of the rim portion, and the third icon is displayed so as to correspond to the third operation region that is provided at the height position of the lower portion of the rim portion. Here, the first icon that corresponds to the first operation region is displayed so as to protrude-out toward the transverse direction outer side of the display portion, further than the second and third icons that correspond to the second and third operation regions.

The first operation region of the steering wheel is the operation region at which the moved distance of the operating finger of the switches, in the state in which the vehicle occupant grasps the center of the rim portion, is the shortest. Accordingly, due to the first icon that corresponds to the first operation region being displayed so as to be disposed at the outer side of the display portion, the vehicle occupant can, while looking at the display portion, intuitively grasp the distance of movement of the operating finger with respect to the respective operation regions.

A display method for a vehicle relating to a fifth aspect of the present disclosure is a display method for a vehicle displaying, on a display portion provided at a front side of a steering wheel, plural icons corresponding to a steering switch group, the method including setting aspect ratios of the icons such that a proportion of a width in the aspect ratio of the icon is large as compared with a proportion of a width in a width-to-height ratio of a corresponding operation region of the steering wheel.

A display method for a vehicle relating to a fifth aspect of the present disclosure is a display method for a vehicle displaying, on a display portion provided at a front side of a steering wheel, plural icons corresponding to a steering wheel switch group, the method including setting aspect ratios of the icons such that a proportion of a width in the aspect ratio of the icon is large as compared with a proportion of a width in a width-to-height ratio of a corresponding operation region of the steering wheel.

A non-transitory recording medium for a vehicle relating to a sixth aspect of the present disclosure records a program that displays, on a display portion provided at a front side of a steering wheel, plural icons corresponding to a steering wheel switch group, wherein the program causes a computer to execute a processing of setting aspect ratios of the icons such that a proportion of a width in the aspect ratio of the icon is large as compared with a proportion of a width in a width-to-height ratio of a corresponding operation region of the steering wheel.

As described above, the display control device for a vehicle, display method, and program relating to the present invention have the excellent effect of being able to suppress erroneous input at the time when a vehicle occupant operates a steering wheel switch, without the vehicle occupant greatly moving his/her sightline while driving.

BRIEF DESCRIPTION OF THE DRAWINGS

Exemplary embodiments of the present invention will be described in detail based on the following figures, wherein.

DETAILED DESCRIPTION

Figure 1:
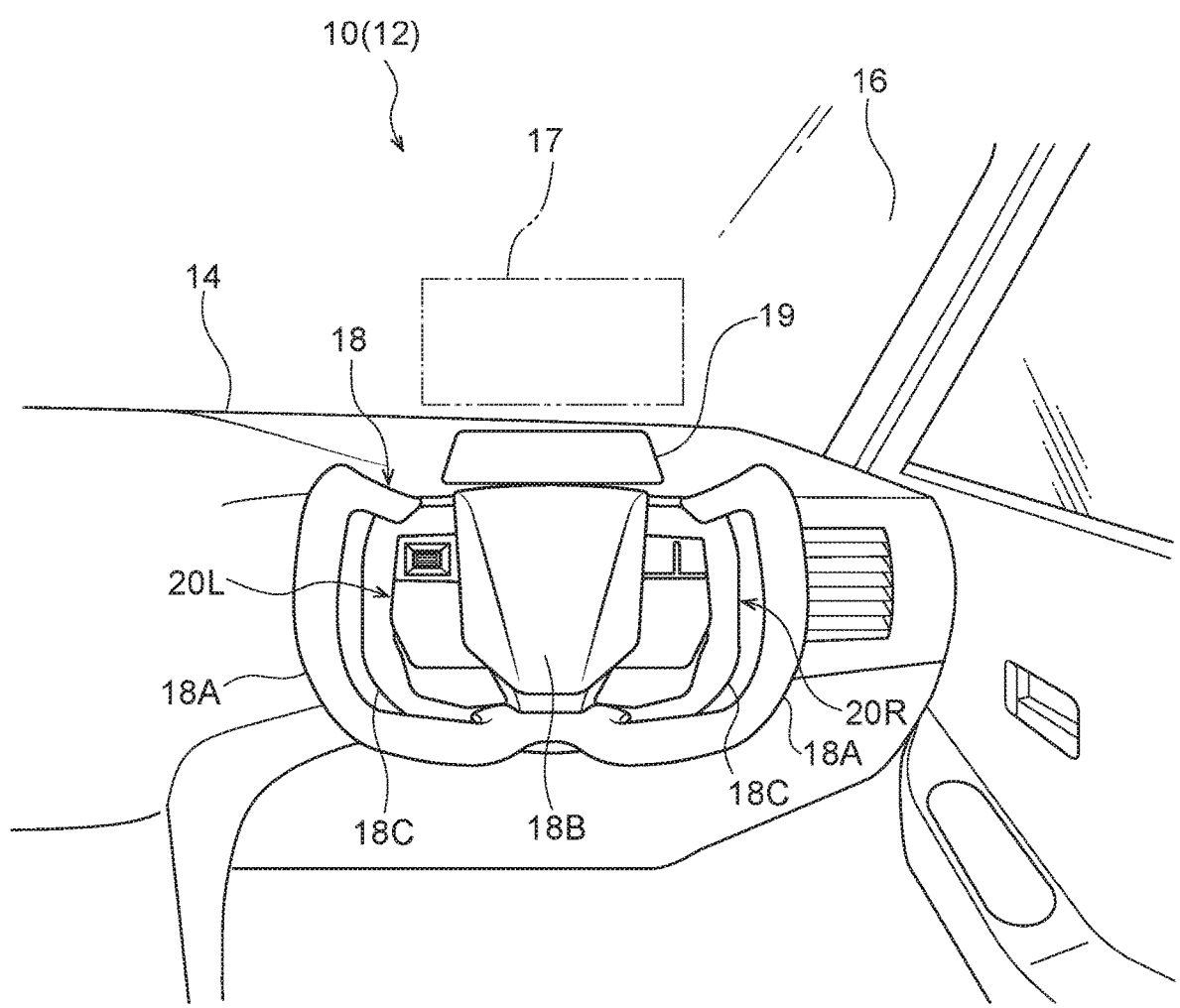
FIG. 1 is a drawing in which the front portion of a cabin of a vehicle, to which a display control device for a vehicle relating to a present embodiment is applied, is seen from a vehicle rear side.

A display control device 10 for a vehicle relating to a present embodiment is described hereinafter with reference to FIG. 1 through FIG. 8. As illustrated in FIG. 1, an instrument panel 14 is disposed at the front portion of the cabin of a vehicle 12 to which the display control device 10 for a vehicle of the present embodiment is applied. A windshield glass 16 is disposed at the front end portion of the instrument panel 14. The windshield glass 16 extends in the vehicle vertical direction and the vehicle transverse direction, and separates the vehicle cabin interior and the vehicle cabin exterior.

A display screen 17 is set at the windshield glass 16. The display screen 17 is a projection surface at which images are projected from a head-up display 15 (see FIG. 6) onto a partial region of the windshield glass 16, and is set at a region of the windshield glass 16 which region is at the vehicle front side of the driver's seat.

A gauge display 19 is provided at the driver's seat side (the vehicle right side) of the instrument panel 14. Information relating to the traveling of the vehicle 12 such as the vehicle speed, the engine speed, the traveled distance and the like, and information relating to states of the vehicle 12 such as warning lamps, the operated states of the lights, and the like, can be displayed in the gauge display 19. The gauge display 19 is provided at the vehicle front side of the driver's seat and at the upper side of a steering wheel 18 that is described hereinafter.

The steering wheel 18 is provided via an unillustrated steering column at the instrument panel 14, at the lower side of the gauge display 19. The steering wheel 18 has a pair of rim portions 18A that are provided at the left and right in the vehicle transverse direction. The pair of rim portions 18A are respectively formed in the shapes of circular arcs that are convex toward the vehicle transverse direction outer sides, and are provided so as to protrude-out toward the left and the right with respect to the central portion. The vehicle occupant in the driver's seat grasps the pair of rim portions 18A with his/her left and right hands, and carries out steering of the steering wheel 18.

A hub portion 18B that structures the central portion is provided between the pair of rim portions 18A. The rim portions 18A and the hub portion 18B are connected by plural (two in the present embodiment) spoke portions 18C.

The spoke portions 18C are provided at two places, which are between the right-side rim portion 18A and the hub portion 18B, and between the left-side rim portion 18A and the hub portion 18B. Here, a right-side switch 20R is provided at the spoke portion 18C that is between the right-side rim portion 18A and the hub portion 18B. Further, a left-side switch is provided at the spoke portion 18C that is between the left-side rim portion 18A and the hub portion 18B. Details of the right-side switch 20R and the left-side switch 20L are described later.

Each of the right-side switch 20R and the left-side switch 20L structures a steering wheel switch group that includes plural switches. The present embodiment is structured such that, when operations with respect to the right-side switch 20R and the left-side switch 20L are sensed by the display control device 10 for a vehicle, plural icons expressing the respective switches are displayed on a display portion provided at the front side of the driver's seat.

As examples, the above-described display screen 17 of the windshield glass 16 and gauge display 19 of the instrument panel 14 can be used as the display portion. The display portion of the present embodiment is, as an example, the gauge display 19.

Hardware Structures

Figure 6:
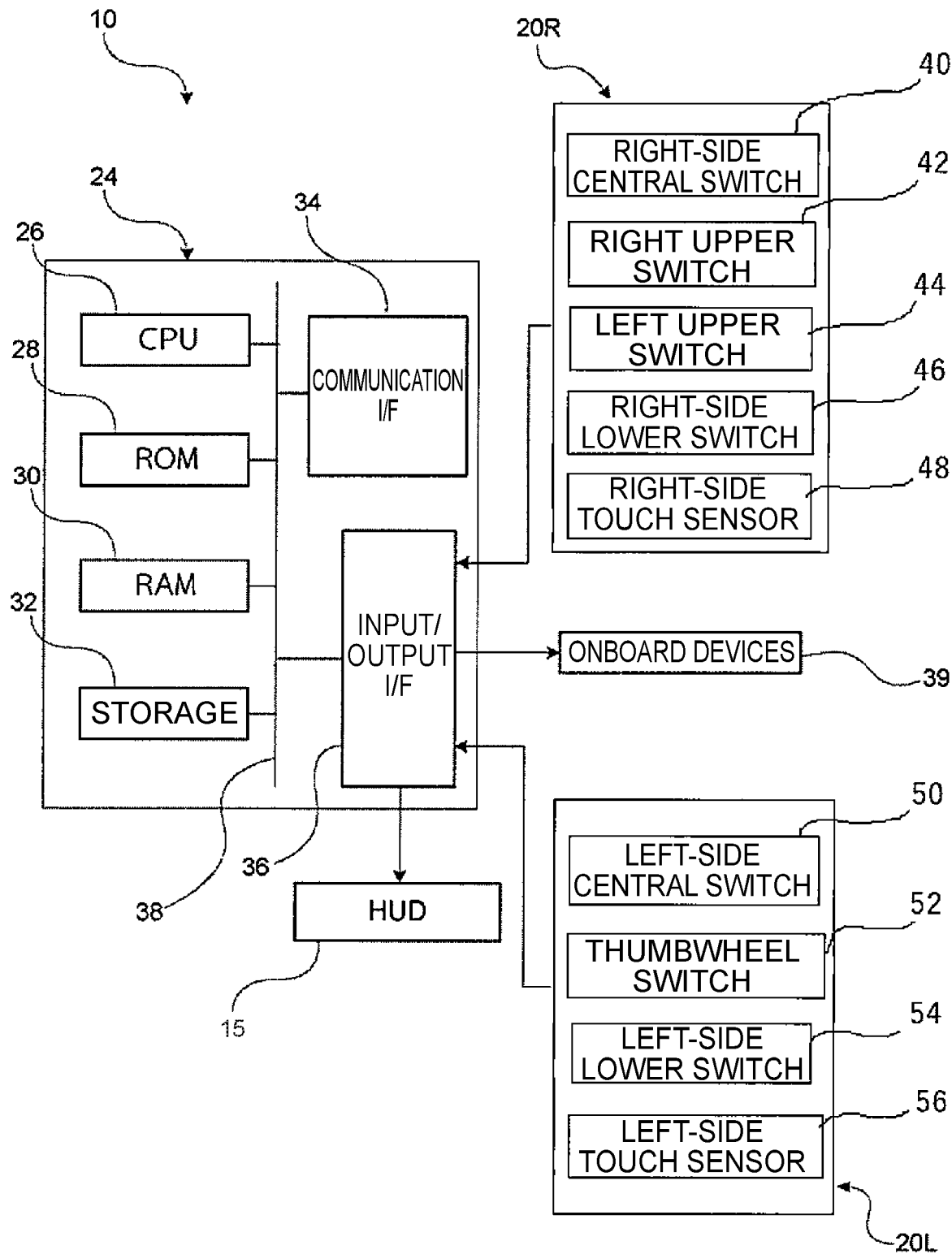
FIG. 6 is a block drawing illustrating hardware structures of the display control device for a vehicle relating to the present embodiment.

FIG. 6 is a block drawing illustrating hardware structures of the display control device 10 for a vehicle. As illustrated in FIG. 6, the display control device 10 for a vehicle is structured to include a CPU (Central Processing Unit: processor) 26, a ROM (Read Only Memory) 28, a RAM (Random Access Memory) 30, a storage 32, a communication interface 34 and an input/output interface 36. These respective structures are connected so as to be able to communicate with one another via bus 38.

The CPU 26 is a central computing processing unit, and executes various programs and controls respective sections. Namely, the CPU 26 reads-out a program from the ROM 28 or the storage 32, and executes the program by using the RAM 30 as a workspace. The CPU 26 carries out control of the above-described respective structures, and various computing processings, in accordance with programs recorded in the ROM 28 or the storage 32.

The ROM 28 stores various programs and various data. The RAM 30 temporarily stores programs and data as a workspace. The storage 32 is structured by an HDD (Hard Disk Drive) or an SSD (Solid State Drive), and stores various programs, including the operating system, and various data.

The communication interface 34 is an interface for the ECU 24 to communicate with a server and other devices. Standards such as, for example, Ethernet®, FDDI, Wi-Fi® or the like are used at the communication interface 34.

The HUD (head-up display) 19, onboard devices 39, the right-side switch 20R and the left-side switch 20L are connected to the input/output interface 36. Specifically, the input/output interface 36 is connected to the HUD 19 that projects images onto the display screen 17. The input/output interface 36 receives signals from the CPU 26, and images are projected from the HUD 19 onto the display screen 17. Further, the onboard devices 39 are a generic term that includes, in addition to equipment such as the air conditioner, the audio system, the car navigation system, a voice input device and the like, also travel assist equipment such as the ACC (Adaptive Cruise Control), the LTA (Lane Tracing Assist) and the like.

Steering Wheel Switch Groups

Figure 4:
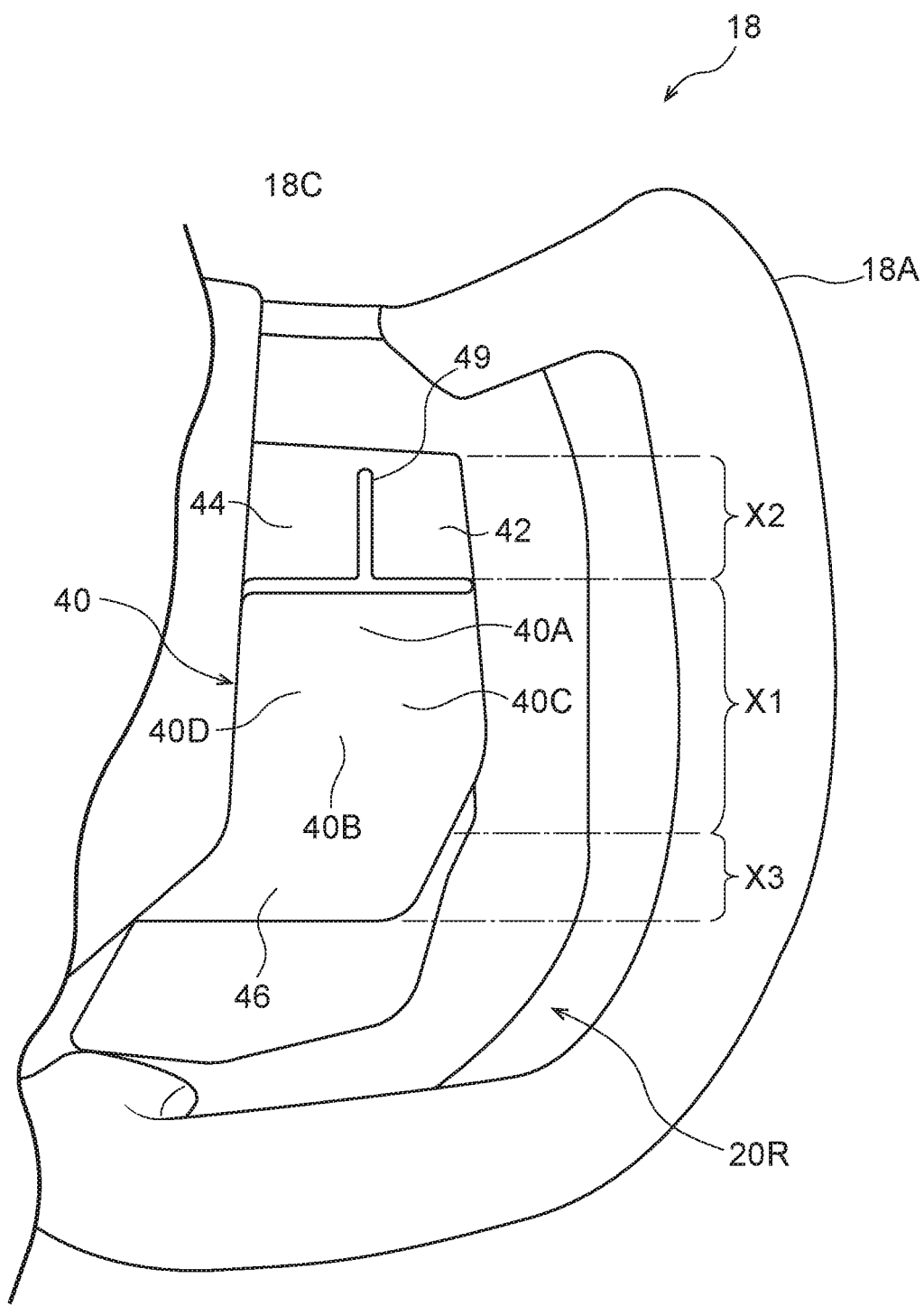
FIG. 4 is an enlarged view of main portions illustrating a portion of the steering wheel in an enlarged manner.

The right-side switch 20R and the left-side switch 20L that structure the steering wheel switch groups are disposed at operation regions that are provided at the surfaces of the two spoke portions 18C. As illustrated in FIG. 4, the operation region of each spoke portion 18C includes a first operation region X1 provided at the height of the center of the rim portion 18A, a second operation region X2 provided at the height of the upper portion of the rim portion 18A, and a third operation region X3 provided at the height of the lower portion of the rim portion 18A. The plural switches structuring the steering wheel switch groups are, for example, disposed so as to be divided per function among the respective operation regions.

Note that the first operation region X1 of the spoke portion 18C is the operation region at which the moved distance of the operating finger (e.g., the thumb), which operates the switches in the state in which the vehicle occupant is grasping the center of the rim portion 18A, is the shortest.

The right-side switch 20R is structured by plural, touch-sensor-type touch switches. Specifically, the right-side switch 20R has a right-side central switch 40 located in the center, a right upper switch 42 located at the upper right, a left upper switch 44 located at the upper left, and a right-side lower switch 46 located at the lower portion.

Further, the right-side switch 20R has a right-side touch sensor 48 that senses touch operations of the respective switches of the right-side switch 20R. The right-side touch sensor 48 is structured by, for example, an electrostatic-capacitance-type electrostatic sensor, and can sense the contact of an operating finger on the surface of the right-side switch 20R.

Figure 2:
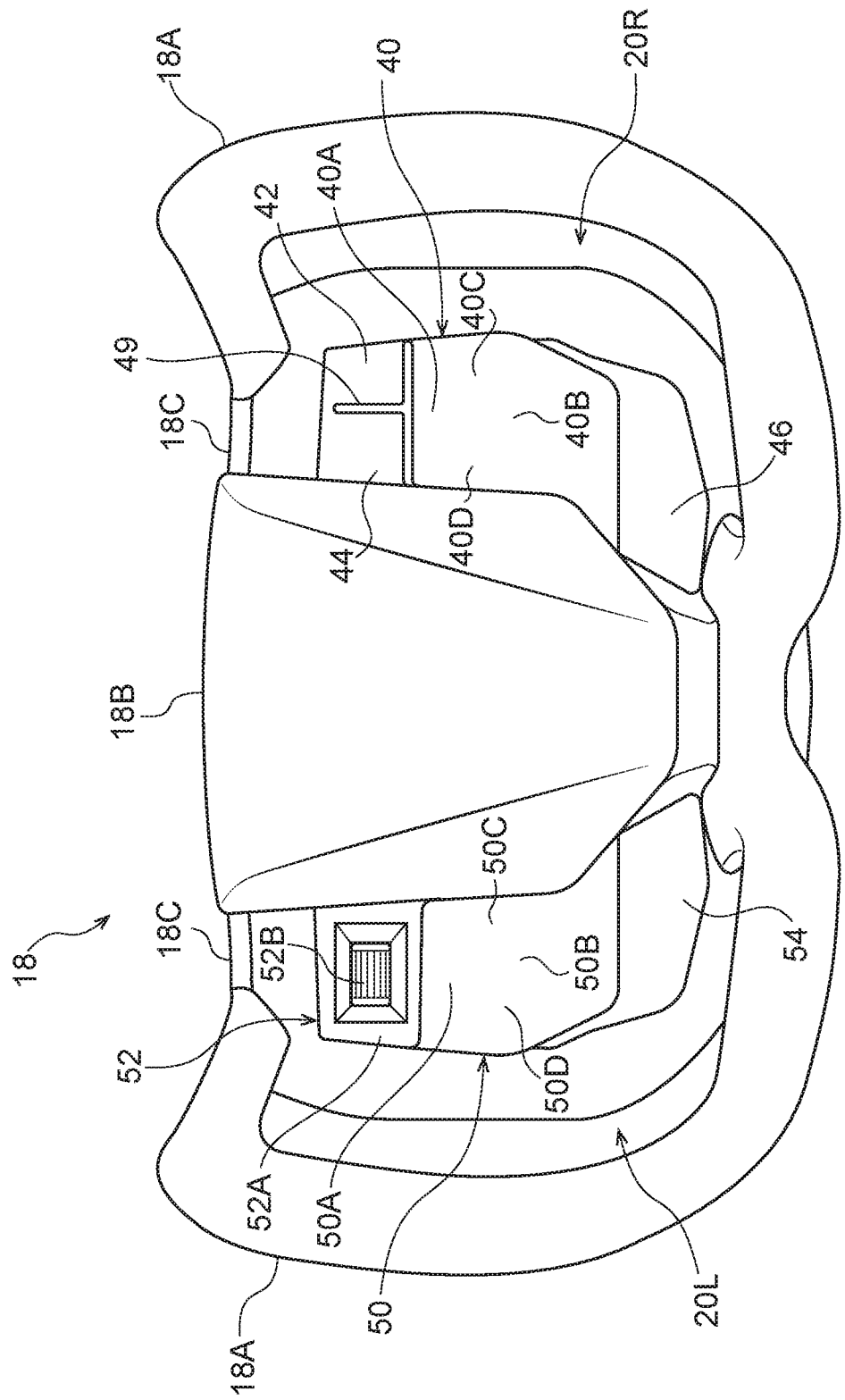
FIG. 2 is a front view of a steering wheel.

As illustrated in FIG. 2 and FIG. 4, the right-side central switch 40 is disposed at the first operation region X1 of the spoke portion 18C that is provided at the right side of the steering wheel 18. The right-side central switch 40 has an operation surface that is substantially rectangular, and the upper, lower, right and left respective regions thereof are an upper switch 40A, a lower switch 40B, a right switch 40C and a left switch 40D. These sensor switches are used mainly at the time of operating the travel assist equipment that are centered around the gauge display of the various onboard devices.

Note that, in a case in which the images (icons or characters expressing the respective switches) that are displayed on the gauge display 19 are switched, different functions are assigned to the upper switch 40A, the lower switch 40B, the right switch 40C and the left switch 40D.

The right upper switch 42 is disposed in the second operation region X2 of the spoke portion 18C. The right upper switch 42 is located at the upper right of the right-side central switch 40, and has an operation surface that is substantially rectangular and has a width that is approximately ½ of that of the operation surface of the right-side central switch 40. The function of operating the ACC is assigned to this right upper switch 42.

The left upper switch 44 is disposed in the second operation region X2 of the spoke portion 18C. The left upper switch 44 is located at the upper left of the right-side central switch 40, and has an operation surface that is substantially rectangular and has a width that is approximately ½ of that of the operation surface of the right-side central switch 40. The function of operating the LTA is assigned to this left upper switch 44.

Note that, in the present embodiment, a distinguishing projection 49, which is shaped as an upside-down T and separates the right-side central switch 40, the right upper switch 42 and the left upper switch 44, is provided at the borderline of the first operation region X1 and the second operation region X2 of the spoke portion 18C. Due to the vehicle occupant obtaining the tactile sensation of his/her fingertip riding-up over the distinguishing projection 49 on the operation regions of the right-side switch 20R, the vehicle occupant can operate an arbitrary switch without visually confirming the operation surface of the steering wheel switch.

The right-side lower switch 46 is disposed in the third operation region X3 of the spoke portion 18C. The right-side lower switch 46 is located at the lower side of the right-side central switch 40, and has an operation surface that is substantially rectangular and has a width equivalent to that of the operation surface of the right-side central switch 40. The function of switching the images (icons or characters) corresponding to the right-side switch 20R that are displayed on the gauge display 19 is assigned to this right-side lower switch 46. Namely, the right-side lower switch 46 switches the layer that is being displayed on the gauge display 19.

On the other hand, the left-side switch 20L is structured by plural, touch-sensor-type touch switches, and a non-touch-sensor-type switch. Specifically, the left-side switch 20L has a left-side central switch 50 located at the center, a thumbwheel switch 52 located at the upper portion, and a left-side lower switch 54 located at the lower portion.

Further, the left-side switch 20L has a left-side touch sensor 56 that senses touch operations of the left-side central switch 50 and the left-side lower switch 54 that are touch-sensor types. The left-side touch sensor 56 is structured by, for example, an electrostatic-capacitance-type electrostatic sensor, and can sense the contact of an operating finger on the surfaces of the left-side central switch 50 and the left-side lower switch 54.

The left-side central switch 50 is disposed in the first operation region X1 of the spoke portion 18C provided at the left side of the steering wheel 18. The left-side central switch 50 is structured by a touch-sensor-type touch switch. The left-side central switch 50 has an operation surface that is substantially rectangular, and the upper, lower, right and left respective regions thereof are an upper switch 50A, a lower switch 50B, a right switch 50C and a left switch 50D. Note that functions that differ in accordance with the layer displayed on the gauge display 19 are assigned to the upper switch 50A, the lower switch SOB, the right switch 50C and the left switch 50D.

The thumbwheel switch 52 is disposed in the second operation region X2 of the spoke portion 18C. The thumbwheel switch 52 is disposed at the upper side of the left-side central switch 50, and is structured by a non-touch-sensor-type switch. The thumbwheel switch 52 is a rotary switch structured by a known thumbwheel mechanism, and has a thumbwheel 52B that is provided so as to be able to be rotatingly operated through an opening of a switch bezel 52A provided at the spoke portion 18C. Due to output of signals corresponding to the rotating direction and the rotated amount of the thumbwheel 52B, the thumbwheel switch 52 carries out input operations to the onboard device assigned to the switch. In the present embodiment, the function of adjusting the volume of the audio system is assigned to the thumbwheel switch 52.

The left-side lower switch 54 is disposed in the third operation region X3 of the spoke portion 18C. The left-side lower switch 54 is structured by a touch-sensor-type switch, is disposed at the lower side of the left-side central switch 50, and has an operation surface that is substantially rectangular and has a width equivalent to that of the operation surface of the left-side central switch 50. The function of switching the layer of the images corresponding to the left-side switch 20L that are displayed on the gauge display 19, is assigned to this left-side lower switch 54.

Functional Structures

The display control device 10 for a vehicle realizes various functions by using the hardware resources illustrated in FIG. 6. The functional structures realized by the display control device 10 for a vehicle are described with reference to FIG. 7.

Figure 7:
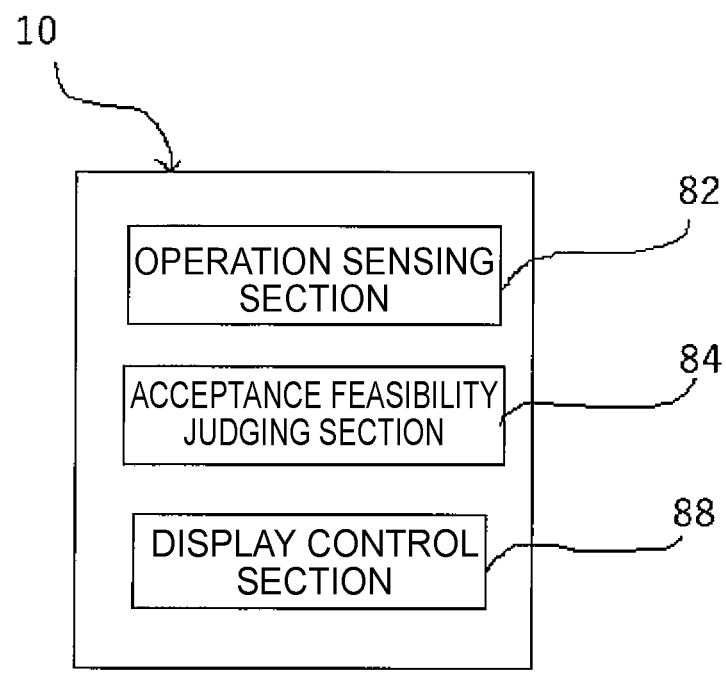
FIG. 7 is a block drawing illustrating functional structures of the display control device for a vehicle relating to the present embodiment.

As illustrated in FIG. 7, the display control device 10 for a vehicle is structured to include, as the functional structures thereof, a communication section 80, an operation sensing section 82, an acceptance feasibility judging section 84 and a display control section 88. These respective functional structures are realized by the CPU 26 reading-out and executing a program stored in the ROM 28 or the storage 32.

The communication section 80 carries out communication with a server, equipment at the exterior of the vehicle, and the like via the communication interface 34.

The operation sensing section 82 senses operation of the right-side switch 20R and the left-side switch 20L. Specifically, due to one of the touch-sensor-type switches of the right-side switch 20R and the left-side switch 20L being operated by touch, the operation sensing section 82 senses the input to the onboard device 39 corresponding to the operated switch. Further, due to the thumbwheel switch 52 (a non-touch-type switch) of the left-side switch 20L being operated, the operation sensing section 82 senses the input to the onboard device 39 corresponding to the thumbwheel switch 52.

The acceptance feasibility judging section 84 judges whether or not operation is possible, at the time when an input to the onboard device 39 is sensed by the function of the operation sensing section 82. Namely, functions that differ in accordance with the layer displayed on the gauge display 19 are assigned to the right-side central switch 40 and the left-side central switch 50, and therefore, in some layers, the right-side central switch 40 and the left-side central switch 50 are switched to states in which operation is not possible. Further, for each of the right-side central switch 40 and the left-side central switch 50, the acceptance feasibility judging section 84 judges whether or not there is a state in which operation is not possible, which is a state in which input cannot be accepted.

In a case in which a touch operation with respect to one of the switches that structure the right-side switch 20R and the left-side switch 20L is sensed by the function of the operation sensing section 82, the display control section 88 specifies the operation region to which the switch, at which the touch operation was carried out, belongs. The display control section 88 displays images (icons or characters) corresponding to the specified operation region and the operation region adjacent to that specified operation region, on the gauge display 19.

Explanation of Displayed Information

Figure 3:
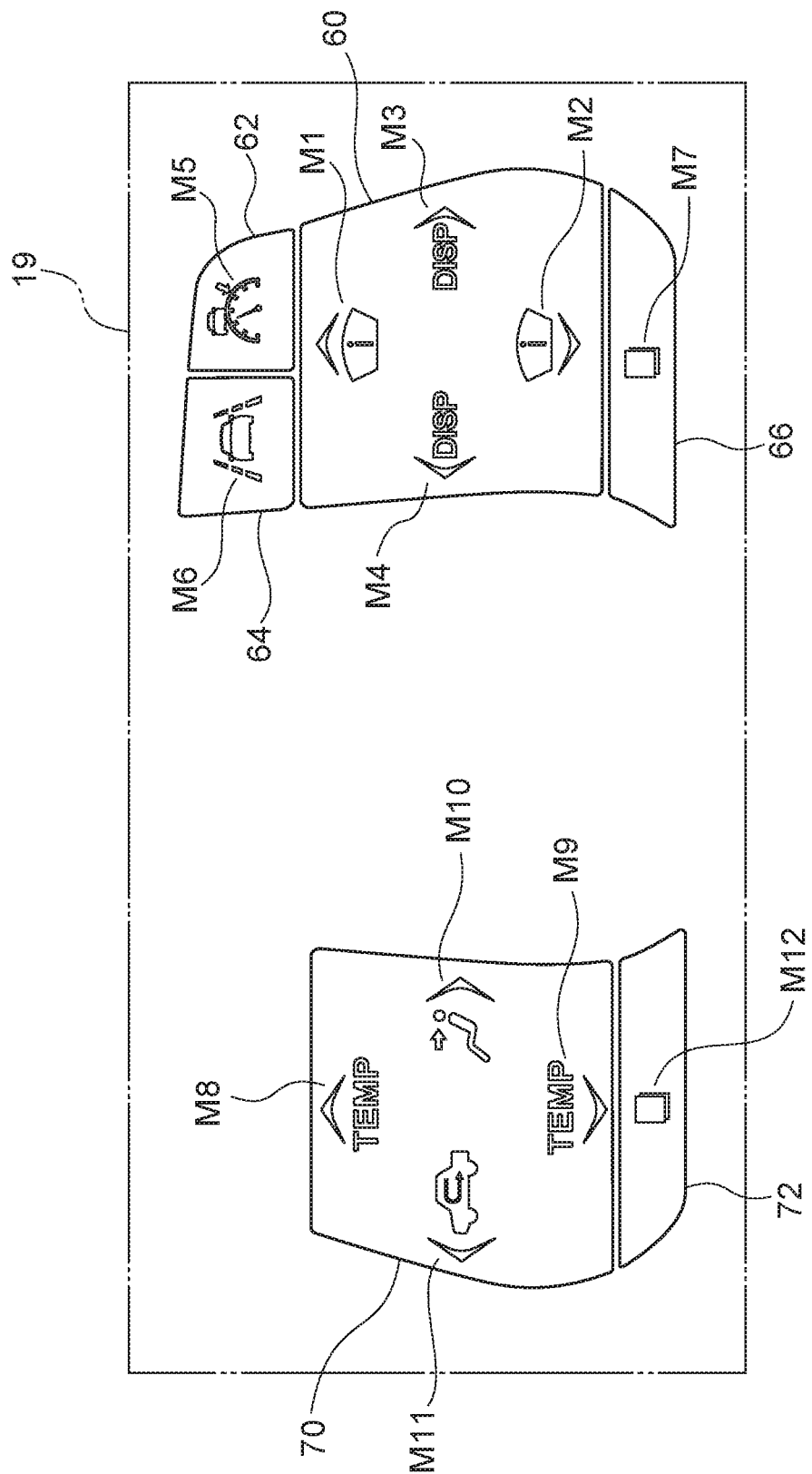
FIG. 3 is a drawing illustrating a display example of a display portion in the present embodiment, and illustrates icons corresponding to a left-side switch and a right-side switch.
Figure 5:
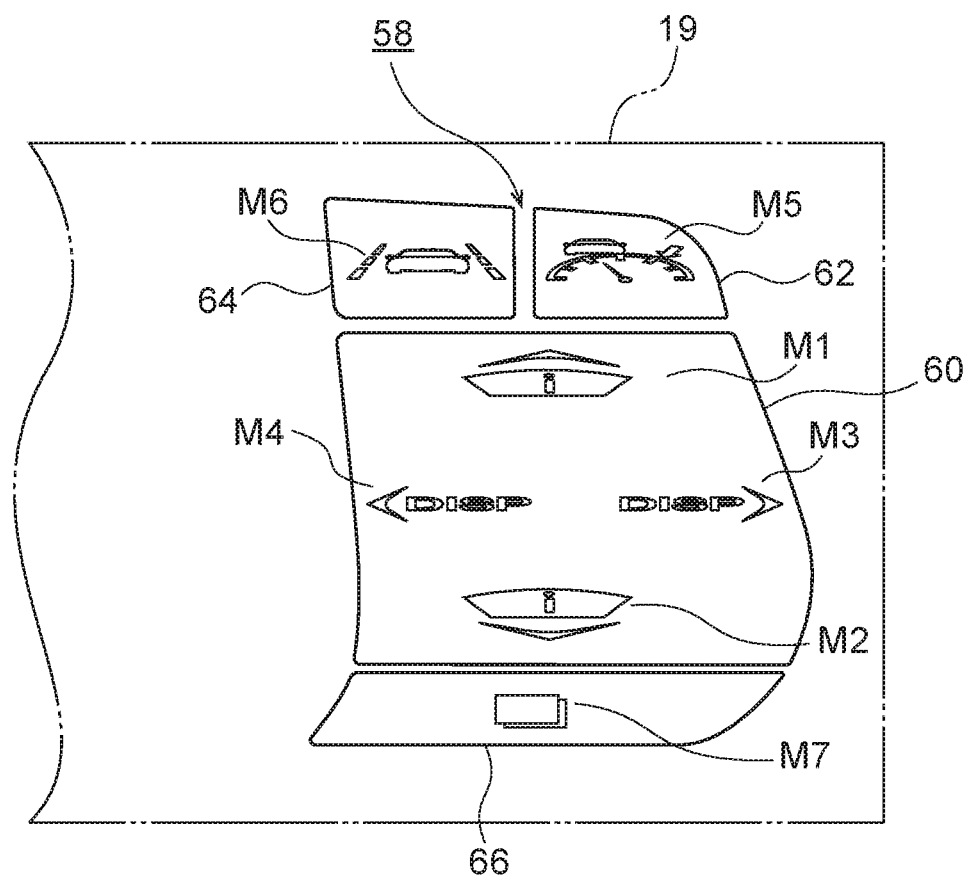
FIG. 5 is an enlarged view of main portions illustrating a display example of icons corresponding to the right-side switch.

An example of displayed information that is displayed on the gauge display 19 of the present embodiment is described here with reference to FIG. 3 through FIG. 5. An image of a menu screen that corresponds to the right-side switch 20R, and an image of a menu screen that corresponds to the left-side switch 20L, are illustrated in FIG. 3. These menu screens are expressed by plural icons that model the appearances of the operation surfaces at which the right-side switch 20R and the left-side switch 20L are located. The display of the plural icons corresponds to the relationship of the placement of the steering wheel switch groups.

As illustrated in FIG. 3, a right-side central frame portion 60 is displayed at the right side of the gauge display 19. The right-side central frame portion 60 is an icon corresponding to the first operation region X1 of the spoke portion 18C provided at the right side of the steering wheel 18, and corresponds to the "first icon" in the present invention. This right-side central frame portion 60 is an image that is modeled after the right-side central switch 40. Icons M1 through M4 are displayed in the upper, lower, right and left regions of the right-side central frame portion 60, and correspond to the upper switch 40A, the lower switch 40B, the right switch 40C and the left switch 40D of the right-side central switch 40.

In the present embodiment, the icons M1 and M2 are icons displaying images that model displays in which the letter "i" is displayed near images of arrows indicating the upward and downward directions. The icons M1 and M2 correspond to functions of setting details of the displayed contents on the gauge display 19 and the display screen 17.

The icons M3 and M4 are icons displaying images that model the text "DISP" near images of arrows indicating the leftward and rightward directions. The icons M3 and M4 correspond to functions of carrying out switching of the various gauge displays that are set so as to be able to be displayed on the gauge display 19 and the display screen 17.

A right upper frame portion 62 is displayed at the upper right of the right-side central frame portion 60. The right upper frame portion 62 is one of the plural icons corresponding to the second operation region X2 of the spoke portion 18C provided at the right side of the steering wheel 18, and corresponds to the "second icon" in the present invention. The right upper frame portion 62 is an icon modeled after the right upper switch 42. An icon M5 of a shape that is modeled after a vehicle and a gauge is displayed so as to be superposed on the right upper frame portion 62. The icon M5 corresponds to the function of the ACC.

A left upper frame portion 64 is displayed at the upper left of the right-side central frame portion 60. The left upper frame portion 64 is one of the plural icons corresponding to the second operation region X2 of the spoke portion 18C provided at the right side of the steering wheel 18, and corresponds to the "second icon" in the present invention. The left upper frame portion 64 is an icon that is modeled after the left upper switch 44. An icon M6 that is modeled after a vehicle and a vehicle lane is displayed so as to be superposed on the left upper frame portion 64. The icon M6 corresponds to the function of the LTA.

Note that, as illustrated in FIG. 5, a distinguishing gap 58 corresponding to the shape of the distinguishing projection 49 is provided such that the right-side central frame portion 60, the right upper frame portion 62 and the left upper frame portion 64 are displayed in forms of islands.

In the present embodiment, the operation surfaces of the right-side central switch 40, the right upper switch 42 and the left upper switch 44 are separated by the distinguishing projection 49 that is provided so as to project at the first operation region X1 and the second operation region X2. In other words, the right-side central frame portion 60, the right upper frame portion 62 and the left upper frame portion 64 are icons corresponding to the sections demarcated by the distinguishing projection 49.

A right-side lower frame portion 66 is displayed beneath the right-side central frame portion 60. The right-side lower frame portion 66 is an icon corresponding to the third operation region X3 of the spoke portion 18C provided at the right side of the steering wheel 18, and corresponds to the "third icon" of the present invention. The right-side lower frame portion 66 is an icon that is modeled after the right-side lower switch 46. An icon M7 that is modeled after a shape of overlapping rectangles is displayed so as to be superposed on the right-side lower frame portion 66. The icon M7 corresponds to the function of changing the layer of the images (icons or characters) corresponding to the right-side switch 20R. Namely, the onboard devices that are assigned to the right-side switch 20R are changed by switching the display.

Returning to FIG. 3, a left-side central frame portion 70 is displayed at the left side of the gauge display 19. The left-side central frame portion 70 is an icon corresponding to the first operation region X1 of the spoke portion 18C that is provided at the left side of the steering wheel 18. The left-side central frame portion 70 is an icon of an image modeled after the left-side central switch 50.

As an example, icons M8 through M11 are displayed in the upper, lower, right and left regions of the left-side central frame portion 70. These icons M8 through M11 correspond to the upper switch 50A, the lower switch 50B, the right switch 50C and the left switch 50D of the left-side central switch 50. Mainly operations of the air conditioner of the vehicle are assigned to the icons M8 and M9.

The icons M8 and M9 are icons displaying the text "TEMP" near images of arrows indicating the upward and downward directions, and correspond to functions of changing the air conditioning temperature of the air conditioner. The icon M10 is a shape modeled after a vehicle occupant and the blowing direction, and corresponds to the function of changing the blowing direction of the air conditioner. The icon M11 is a shape modeled after a vehicle, and corresponds to the function of circulating internal air.

A left-side lower frame portion 72 is displayed beneath the left-side central frame portion 70. The left-side lower frame portion 72 is an icon corresponding to the third operation region X3 of the spoke portion 18C provided at the left side of the steering wheel 18. The left-side lower frame portion 72 is an icon that is modeled after the left-side lower switch 54. An icon M12 that is modeled after a shape of overlapping rectangles is displayed so as to be superposed on the left-side lower frame portion 72. The icon M12 corresponds to the function of changing the layer of the images (icons or characters) corresponding to the left-side switch 20L. Namely, the onboard devices that are assigned to the left-side switch 20l, are changed by switching the display.

Visual Effects of Forms of Display

Details of the forms of display of the respective icons displayed on the gauge display 19, and the visual effects that are realized thereby, are described. Here, explanation is given by using, as an example, the display of the icons corresponding to the right-side switch that is illustrated in FIG. 5. The example illustrated in FIG. 5 is a display example of a case in which a touch operation of one of the plural switches that structure the right-side central switch 40 has been sensed.

As illustrated in this figure, when a touch operation is carried out on the operation surface of the right-side central switch 40, the icon of the right-side central frame portion 60, which corresponds to the first operation region X1 at which the right-side central switch 40 is disposed, is displayed. Further, icons of the right upper frame portion 62, the left upper frame portion 64 and the right-side lower frame portion 66, which correspond to the second and third operation regions X2, X3 that are adjacent to the first operation region, are displayed so as to be lined-up with the icon of the right-side central frame portion 60. Due thereto, while the vehicle occupant operates a switch that is disposed in one operation region, the vehicle occupant can grasp the arrangement of the switches of the adjacent operation region(s) from the icons displayed on the gauge display 19.

Here, the aspect ratio of each icon is set such that the proportion of the width in the aspect ratio of the icon is large as compared with the proportion of the width in the width-to-height ratio of the corresponding operation region of the steering wheel 18. For example, the aspect ratio of the right-side central frame portion 60 is set such that the proportion of the width thereof is large as compared with that of the width-to-height ratio of the first operation region X1 (the right-side central switch 40). Accordingly, each icon is displayed so as to have an outer shape that is long in the lateral direction (the width direction of the display portion) as compared with the outer shape of the actual operation region.

Further, the right-side central frame portion 60, the right upper frame portion 62 and the left upper frame portion 64 are displayed in states in which the distinguishing gap 58 that corresponds to the distinguishing projection 49 is provided between the respective icons. Due thereto, there can be provided the visual effect that the tactile perception of the operating finger riding-up over the distinguishing projection at the time of moving between adjacent switches is associated with the visual information of crossing-over the distinguishing gap and operating the adjacent icon.

Further, the right-side central frame portion 60 that corresponds to the first operation region X1 of the spoke portion 18C is displayed so as to protrude-out further toward the transverse direction outer side (the right side in FIG. 5) of the display portion than the icons corresponding to the second and third operation regions X2, X3 (the right upper frame portion 62, the left upper frame portion 64, the right-side lower frame portion 66). This right-side central frame portion 60 is an icon corresponding to the first operation region X1 that is provided at the height of the center of the rim portion, and is the operation region at which the moved distance of the operating finger (e.g., the thumb), which operates the switches in the state in which the vehicle occupant is grasping the center of the rim portion 18A, is the shortest. Accordingly, by displaying the right-side central frame portion 60, which corresponds to the first operation region X1, at the outer side of the display region of the gauge display 19, the vehicle occupant can, while looking at the gauge display 19, intuitively grasp the distance of moving the operating finger corresponding to each operation region.

Example of Display Processing

An example of the flow of the display processing that relates to the above-described right-side switch 20R and is executed by the display control device 10 for a vehicle, is described next with reference to the flowchart of FIG. 8. This display processing is executed at the time when the ignition (power) of the vehicle 12 is turned on, and is carried out due to the CPU 26 reading-out a program from the ROM 28 or the storage 32, and expanding and executing the program in the RAM 30.

Figure 8:
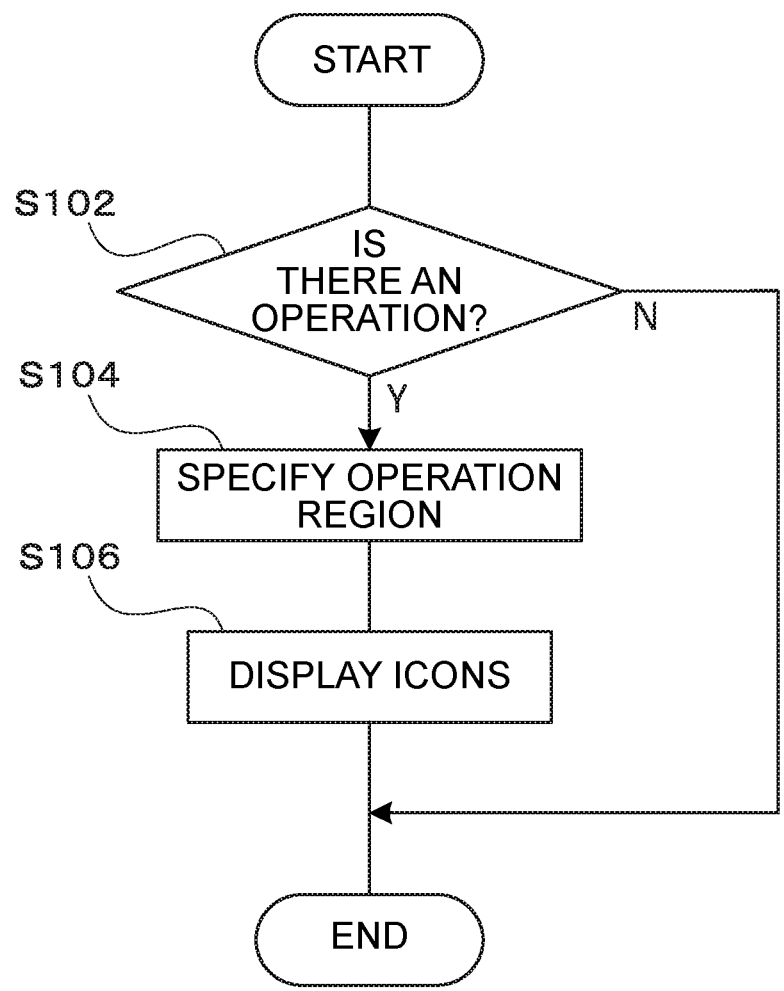
FIG. 8 is a flowchart illustrating an example of the flow of display processing by the display control device for a vehicle relating to the present embodiment.

As illustrated in FIG. 8, in step S102, by the function of the operation sensing section 82, the CPU 26 judges whether or not a touch operation with respect to the right-side switch 20R has been sensed. If the CPU 26 judges that a touch operation has been sensed, the CPU 26 moves on to the processing of step S104. Further, if the CPU 26 judges that a touch operation has not been sensed, the CPU 26 ends the display processing.

In step S104, the CPU 26 specifies the operation region to which the switch, at which the touch operation was sensed, belongs.

In step S106, the CPU 26 displays, on the display portion, the icons corresponding to the respective operation regions that are the operation region to which the switch at which the touch operation was sensed belongs, and the operation regions that are adjacent to that operation region, and the CPU 26 ends the processing.

Effects

As described above, in the display control device 10 for a vehicle of the present embodiment, plural icons corresponding to the right-side switch 20R are displayed on the gauge display 19 (the display portion) that is provided at the front side of the steering wheel 18. Due thereto, the vehicle occupant can perceive an arbitrary switch in a state in which his/her sightline is directed forward, without directing his/her gaze toward the steering wheel 18.

The aspect ratios of the icons that are displayed on the gauge display 19 are set such that the proportion of the width in the aspect ratio of the icon is large as compared with the proportion of the width in the width-to-height ratio of the corresponding operation region of the steering wheel 18. Due thereto, even if there are great constraints on the region in the vertical direction when plural icons are displayed on the gauge display 19, by setting the proportion of the width in the aspect ratio of each icon to be large, the icons can be presented in a form in which it is easy to grasp the arrangement of the plural icons. As a result, erroneous input at the time when a vehicle occupant operates a steering wheel switch while looking at the gauge display 19 can be suppressed.

In the display control device 10 for a vehicle, an operation with respect to one of the first operation region X1 through the third operation region X3, which are provided at the surface of the steering wheel 18, is sensed. When an operation with respect to one of the first operation region X1 through the third operation region X3 is sensed, both the icon corresponding to the operation region at which the operation was sensed, and the icon corresponding to another operation region that is adjacent to that operation region, are displayed. Due thereto, while the vehicle occupant operates a switch that is disposed at one of the operation regions, the vehicle occupant can, from the icons, understand the arrangement of the switches of an adjacent operation region.

As illustrated in FIG. 5, at the display control device 10 for a vehicle, the plural icons, which correspond to the sections demarcated by the distinguishing projection 49 that is provided so as to project-out at the operation regions of the steering wheel 18, are displayed with the distinguishing gap 58, which corresponds to the distinguishing projection 49, being provided between the adjacent icons. Specifically, in the present embodiment, the right-side central frame portion 60, the right upper frame portion 62 and the left upper frame portion 64 are icons corresponding to the sections demarcated by the distinguishing projection 49. Due thereto, the tactile perception of the operating finger of the vehicle occupant riding-up over the distinguishing projection 49 at the time of moving between adjacent switches is associated with the visual information of crossing-over the distinguishing gap 58 and operating the adjacent icon, and therefore, the vehicle occupant can carry out intuitive operation of a switch while looking at the display portion.

The icon of the right-side central frame portion 60 that corresponds to the first operation region X1 of the spoke portion 18C, is displayed so as to protrude-out further toward the transverse direction outer side at the display region of the gauge display 19, than the plural icons corresponding to the second and third operation regions X2, X3. Specifically, in the present embodiment, the right-side central frame portion 60 is displayed so as to protrude-out further toward the transverse direction outer side of the display than the right upper frame portion 62, the left upper frame portion 64 and the right-side lower frame portion 66. This first operation region X1 is the operation region at which the moved distance of the finger that operates the switches, in the state in which the vehicle occupant grasps the center of the rim portion 18A, is the shortest. Accordingly, due to the icon of the right-side central frame portion 60, which corresponds to the first operation region X1, being displayed so as to be disposed at the outer side of the display region, the vehicle occupant can, while looking at the gauge display 19, intuitively grasp the distance of movement of the operating finger with respect to the respective operation regions X1, X2, X3.

Supplemental Description

Although an embodiment has been described above, the present invention can, of course, be implemented in various forms within a scope that does not depart from the gist thereof. For example, although the above embodiment describes an example of displaying on the gauge display, similar displays may be displayed from the head-up display onto the display screen 17 of the windshield glass 16.

The above embodiment describes an example in which icons are displayed on the display portion in a case in which a touch operation of a touch-sensor-type switch is sensed. However the present disclosure is not limited to this. For example, icons may be displayed on the display portion in a case in which a push operation of a push-type switch is sensed, or icons may be displayed in a case in which operations combining these are sensed.

Moreover, any of various types of processors other than the CPU 26 may execute the processing that is executed due to the CPU 26 reading-in a program in the above-described embodiment. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the above-described processing may be executed by one of these various types of processors, or may be executed by a combination of two or more of the same type or different types of processors, e.g., plural FPGAs, or a combination of a CPU and an FPGA, or the like. Further, the hardware structures of these various types of processors are, more specifically, electrical circuits that combine circuit elements such as semiconductor elements and the like.

Further, the above embodiment is a structure in which various data are stored in the storage 32, but the present disclosure is not limited to this. For example, a non-transitory recording medium such as a CD (Compact Disk), a DVD (Digital Versatile Disk), a USB (Universal Serial Bus) memory or the like may be used as the storage. In this case, various programs and data and the like are stored in these recording media.

What is claimed is:

1. A display control device for a vehicle, the device comprising:
   a memory; and
   at least one processor coupled to the memory, wherein the at least one processor is configured to:
   display a plurality of icons at a display portion that is separate from a steering wheel of the vehicle and that is provided at a location that is between the steering wheel and a front end of the vehicle, the plurality of icons that are displayed mimicking an appearance of a steering wheel switch group that is provided on the steering wheel; and
   configure aspect ratios of the icons that are displayed on the display portion such that a proportion of a width in an aspect ratio of each of the icons is greater than a proportion of a width in a width-to-height ratio of a corresponding operation region of the steering wheel, the corresponding operation region containing the steering wheel switch group that is mimicked by the plurality of icons.

2. The display control device of claim 1, wherein:
   the steering wheel switch group is disposed so as to be divided into a plurality of operation regions, which are provided on a surface of the steering wheel,
   the display control device further comprises an operation sensing section that senses operation with respect to one of the plurality of operation regions, and
   in a case in which operation with respect to one of the plurality of operation regions is sensed by the operation sensing section, the at least one processor displays the icons corresponding to a first operation region at which the operation was sensed and corresponding to a second operation region that is adjacent to the first operation region.

3. The display control device of claim 1, wherein:

at the steering wheel, operation surfaces of a plurality of switches of the steering wheel switch group are separated by a distinguishing projection that is provided so as to project out at the operation region, and the at least one processor displays the plurality of icons, which correspond to sections demarcated by the distinguishing projection, with a distinguishing gap that corresponds to the distinguishing projection provided between the icons that are adjacent to each other.

4. The display control device of claim 1, wherein:

the steering wheel has a pair of rim portions that are provided so as to protrude leftward and rightward from a central portion and that are configured to be grasped by an occupant of the vehicle, the operation region includes a first operation region provided at a height of a center of the rim portions, a second operation region provided at a height of an upper portion of the rim portions, and a third operation region provided at a height of a lower portion of the rim portions, at an inner side of the pair of rim portions, and the at least one processor displays a first icon, a second icon and a third icon so as to correspond to a positional relationship between the first operation region, the second operation region and the third operation region, and the first icon that corresponds to the first operation region is displayed so as to protrude out toward a transverse direction outer side of the display portion, with respect to the second icon and the third icon.

5. A display method for a vehicle in which a plurality of icons are displayed at a display portion that is separate from a steering wheel of the vehicle and that is provided at a location that is between the steering wheel and a front end of the vehicle, the plurality of icons that are displayed mimicking an appearance of a steering wheel switch group that is provided on the steering wheel, the method comprising:

configuring aspect ratios of the icons that are displayed on the display portion such that a proportion of a width in an aspect ratio of each of the icons is greater than a proportion of a width in a width-to-height ratio of a corresponding operation region of the steering wheel, the corresponding operation region containing the steering wheel switch group that is mimicked by the plurality of icons.

6. A non-transitory recording medium for a vehicle, the recording medium storing a program executable by a computer to perform processing comprising:

displaying a plurality of icons at a display portion that is separate from a steering wheel of the vehicle and that is provided at a location that is between the steering wheel and a front end of the vehicle, the plurality of icons that are displayed mimicking an appearance of a steering wheel switch group that is provided on the steering wheel; and configuring aspect ratios of the icons that are displayed on the display portion such that a proportion of a width in an aspect ratio of each of the icons is greater than a proportion of a width in a width-to-height ratio of a corresponding operation region of the steering wheel, the corresponding operation region containing the steering wheel switch group that is mimicked by the plurality of icons.

7. The display control device of claim 1, wherein the display portion includes a head-up-display that displays the plurality of icons on a windshield of the vehicle.

8. The display control device of claim 1, wherein the display portion is located on an instrument panel of the vehicle.

* * * * *